(12) United States Patent
Lee et al.

(10) Patent No.: US 12,306,955 B2
(45) Date of Patent: May 20, 2025

(54) CONTROLLER AREA NETWORK FUZZING APPARATUS FOR VEHICLE AND METHOD THEREOF

(71) Applicants: Hyundai Motor Company, Seoul (KR); Kia Corporation, Seoul (KR); Industry Academic Cooperation Foundation, Hallym University, Chuncheon-si (KR)

(72) Inventors: Kwon Hyeong Lee, Ansan-si (KR); Hyo Jin Jo, Anyang-si (KR); Hyung Hoon Kim, Seoul (KR); Yeon Seon Jeong, Chuncheon-si (KR)

(73) Assignees: HYUNDAI MOTOR COMPANY, Seoul (KR); KIA CORPORATION, Seoul (KR); INDUSTRY ACADEMIC COOPERATION FOUNDATION, HALLYM UNIVERSITY, Chuncheon-si (KR)

( * ) Notice: Subject to any disclaimer, the term of this patent is extended or adjusted under 35 U.S.C. 154(b) by 620 days.

(21) Appl. No.: 17/674,247

(22) Filed: Feb. 17, 2022

(65) Prior Publication Data
US 2023/0079725 A1 Mar. 16, 2023

(30) Foreign Application Priority Data
Sep. 14, 2021 (KR) .................. 10-2021-0122671

(51) Int. Cl.
*G06F 21/57* (2013.01)
*H04L 12/40* (2006.01)

(52) U.S. Cl.
CPC ............ *G06F 21/577* (2013.01); *H04L 12/40* (2013.01); *G06F 2221/034* (2013.01); *H04L 2012/40215* (2013.01)

(58) Field of Classification Search
CPC . G06F 21/577; G06F 2221/034; H04L 12/12; H04L 12/40; H04L 2012/40215
See application file for complete search history.

(56) References Cited

U.S. PATENT DOCUMENTS

2019/0296935 A1   9/2019  Hong et al.

FOREIGN PATENT DOCUMENTS

CN    107666476 A  *  2/2018  ....... H04L 12/40006
JP    2018098707 A  *  6/2018
(Continued)

OTHER PUBLICATIONS

D. S. Fowler, J. Bryans, M. Cheah, P. Wooderson and S. A. Shaikh, "A Method for Constructing Automotive Cybersecurity Tests, a CAN Fuzz Testing Example," 2019 IEEE 19th Intl Conf on Software Quality, Reliability and Security Companion (QRS-C), Sofia, Bulgaria, pp. 1-8 (IEEE 2019) (Year: 2019).*

(Continued)

*Primary Examiner* — Theodore C Parsons
(74) *Attorney, Agent, or Firm* — SLATER MATSIL, LLP

(57) ABSTRACT

A controller area network (CAN) fuzzing apparatus for a vehicle includes a communication device having a CAN communication interface, and a controller configured to identify a target CAN identifier (ID) to be diagnosed based on a parameter identifier (PID) code, generate a plurality of CAN messages for fuzzing by inputting a preset value into an unused field or a sensor field in a data field of a CAN message corresponding to the target CAN ID, and perform CAN fuzzing based on the plurality of CAN messages for fuzzing.

20 Claims, 12 Drawing Sheets

(56) References Cited

FOREIGN PATENT DOCUMENTS

| KR | 20190004507 | A  | 1/2019 |
|----|-------------|----|--------|
| KR | 101981138   | B1 | 8/2019 |
| KR | 20190102427 | A  | 9/2019 |

OTHER PUBLICATIONS

H. Lee, K. Choi, K. Chung, J. Kim and K. Yim, "Fuzzing CAN Packets into Automobiles," 2015 IEEE 29th Intl Conf on Advanced Information Networking and Applications, Gwangju, Korea (South), pp. 817-821 (IEEE 2015) (Year: 2015).*

Riss, "Non-Random CAN Fuzzing, ECU, An Efficient ECU Analysis Technology through Non-Random CAN Fuzzing", Jun. 1, 2021, retrieved from http://www.riss.kr/search/detail/DetailView.do?p_mat_type=be54d9b8bc7cdb09&control_no=c326480bf505b1d6ffe0bdc3ef48d419 on Aug. 25, 2021, 52 total pages.

Github, multiple contributors, "CANToolz", retrieved from https://github.com/CANToolz/CANToolz on Feb. 11, 2022, total 6 pages.

Github, multiple contributors, "Caring Caribou", retrieved from https://github.com/CaringCaribou/caringcaribou on Feb. 11, 2022, total 6 pages.

Github, multiple contributors, "pyfuzz_can", retrieved from https://github.com/bhass1/pyfuzz_can on Feb. 11, 2022, total 3 pages.

Github, multiple contributors, "Unified Diagnostic Services Simulator", retrieved from https://github.com/zombieCraig/UDSim on Feb. 11, 2022, total 7 pages.

Github, TianTianlove, "ATG-python", retrieved from https://github.com/TianTianlove/ATG-python on Feb. 11, 2022, total 6 pages.

Kim, Hyunghoon, et al., "An Efficient ECU Analysis Technology through Non-Random CAN Fuzzing", Journal of the Korea Institute of Information Security & Cryptology, vol. 30, No. 6, Dec. 31, 2020, pp. 1115-1130, total 27 pages (with translation).

* cited by examiner

| Description | CAN ID (Frequency) | Data Field (8 byte) | | | | | | | | | | | | | | | |
|---|---|---|---|---|---|---|---|---|---|---|---|---|---|---|---|---|---|
| | | FIELD OF NO. 2 | | | | | | | | FIELD OF NO. 3 | | | | | | | |
| | | 16 | 17 | 18 | 19 | 20 | 21 | 22 | 23 | 24 | 25 | 26 | 27 | 28 | 29 | 30 | 31 |
| Engine RPM (OC) | 0x316 (10ms) | 0.0664 | 0.113 | 0.2001 | 0.2962 | 0.3414 | 0.3512 | 0.3677 | 0.3912 | 0 | 0 | 0.001 | 0.0017 | 0.0029 | 0.0063 | 0.0148 | 0.0262 |

| Engine CAN ID [byte offset] | Sensor CAN ID [byte offset] | | | | | |
|---|---|---|---|---|---|---|
| | 260[2] | 260[5] | 329[6] | 43F[6] | 440[2] | 440[6] |
| 316[2] | 0.7551 | 0.9875 | 0.7591 | 0.9307 | 0.8523 | 0.9307 |
| 316[3] | 0.7551 | 0.9875 | 0.7591 | 0.9307 | 0.8523 | 0.9307 |

Fig.4

| CAN ID | FIELD OF NO. 0 | | | | | | | | FIELD OF NO. 1 | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| 316 | 0 | 0.0001 | 0.0011 | 0.0025 | 0.0056 | 0.011 | 0.0196 | 0.0033 | 0 | 0 | 0 | 0 | 0 | 0 | 0 | 0 | 0.0664 |

CAN ID — Data Field

| 316 | 00 | 00 | 90 | 0a | 37 | 2c | 37 | 8b |
| 316 | 00 | 01 | 90 | 0a | 37 | 2c | 37 | 8b |
| 316 | 00 | 02 | 90 | 0a | 37 | 2c | 37 | 8b |

...

| 316 | 00 | ff | 90 | 0a | 37 | 2c | 37 | 8b |

FIG. 5

| CAN ID | FIELD OF NO. 4 | | | | | | | | FIELD OF NO. 5 | | | | | | | | |
|---|---|---|---|---|---|---|---|---|---|---|---|---|---|---|---|---|---|
| | 32 | 33 | 34 | 35 | 36 | 37 | 37 | 39 | 40 | 41 | 42 | 43 | 44 | 45 | 46 | 47 | 48 |
| 316 | 0.0003 | 0.0033 | 0.0063 | 0.0129 | 0.0251 | 0.0475 | 0.086 | 0.1289 | 0 | 0 | 0.0005 | 0.0006 | 0.0017 | 0.0037 | 0.0074 | 0.0092 | 0.0002 |

Data Field

| CAN ID | | | | | | | | |
|---|---|---|---|---|---|---|---|---|
| 316 | 00 | 17 | 90 | 0a | a9 | 2c | 37 | 8b |

| 316 | 00 | 17 | 90 | 0a | 99 | 2c | 37 | 8b |
|---|---|---|---|---|---|---|---|---|

| 316 | 00 | 17 | 90 | 0a | bf | 2c | 37 | 8b |
|---|---|---|---|---|---|---|---|---|

...

| 316 | 00 | 17 | 90 | 0a | e0 | 2c | 37 | 8b |
|---|---|---|---|---|---|---|---|---|

FIG. 6

| CAN ID | FIELD OF NO. 2 | | | | | | | | FIELD OF NO. 3 | | | | | | | | |
|---|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 | 32 |
| 316 | 0.0664 | 0.113 | 0.2001 | 0.2962 | 0.3414 | 0.3512 | 0.3677 | 0.3912 | 0 | 0 | 0.001 | 0.0017 | 0.0029 | 0.0063 | 0.0148 | 0.0262 | 0.0003 |

| CAN ID | Data Field | | | | | | | |
|---|---|---|---|---|---|---|---|---|
| 316 | 00 | 17 | 2a | 71 | 37 | 2c | 37 | 8b |
| 316 | 00 | 17 | 97 | eb | 37 | 2c | 37 | 8b |
| 316 | 00 | 17 | 19 | 02 | 37 | 2c | 37 | 8b |
| ... | | | | | | | | |
| 316 | 00 | 17 | f0 | 1a | 37 | 2c | 37 | 8b |

FIG. 7

Normal Data

| Engine CAN ID [byte offset] | Sensor CAN ID [byte offset] | | | | |
|---|---|---|---|---|---|
| | 260[2] | 260[5] | 329[6] | 43F[6] | 440[2] | 440[6] |
| 316[2] | 0.7551 | 0.9875 | 0.7591 | 0.9307 | 0.8523 | 0.9307 |
| 316[3] | 0.7551 | 0.9875 | 0.7591 | 0.9307 | 0.8523 | 0.9307 |

⇩

Fuzzing Data

| Engine CAN ID [byte offset] | Sensor CAN ID [byte offset] | | | | |
|---|---|---|---|---|---|
| | 260[2] | 260[5] | 329[6] | 43F[6] | 440[2] | 440[6] |
| 316[2] | None | 0.3603 | None | 0.0363 | None | 0.0209 |
| 316[3] | None | 0.1102 | None | 0.0399 | None | 0.0229 |

FIG. 9

CONTROLLER AREA NETWORK FUZZING APPARATUS FOR VEHICLE AND METHOD THEREOF

CROSS-REFERENCE TO RELATED APPLICATIONS

This application claims the benefit of Korean Patent Application No. 10-2021-0122671, filed on Sep. 14, 2021, which application is hereby incorporated herein by reference.

TECHNICAL FIELD

The present disclosure relates to a non-random controller area network (CAN) fuzzing technology.

BACKGROUND

Recently released vehicles are equipped with a plurality of electronic control units (ECUs), and each ECU communicates through a controller area network (CAN), thereby efficiently controlling the vehicle.

However, because CAN data is transmitted and received in an unencrypted state in a broadcast scheme, the CAN data is vulnerable to security. Because the ECU receives data without an authentication procedure through the broadcast scheme which does not have access control to a network, the vehicle may malfunction when malicious data is injected into the CAN.

In order to prepare for such a vehicle attack, not only the vulnerability check for the external network channel provided by the vehicle, but also the vulnerability check for the ECU mounted in the vehicle is required. For example, the technology for checking the vulnerability of the ECU includes a reverse engineering technology that analyzes the firmware of the ECU and a CAN fuzzing technology that analyzes an error of the ECU using a CAN message.

However, compared to technologies for checking vulnerabilities in external networks of vehicles that have been actively studied, research on vulnerability check technologies for ECUs mounted on vehicles has the following limitations. First, the technology of reverse engineering the firmware of the ECU has a difficulty in physically accessing all ECUs mounted on the vehicle to find a debugging port and acquire the firmware. Second, the CAN fuzzing technology that transmits a random input value through CAN communication takes a huge amount of time due to the transmission of the random input value, and also due to the CAN environment where multiple ECUs share a communication channel, there is a limitation in that it is difficult to monitor the response of a specific ECU.

Conventional CAN fuzzing technology generates a total of $2^{64}$ fuzzing CAN messages by inputting an arbitrary value into a data field in a CAN message having a size of 64 bits, and is required to input the generated total of $2^{64}$ fuzzing CAN messages into the CAN, so that it takes a huge amount of time and also it is not possible to monitor the reaction of a specific ECU.

The matters described in this background section are intended to promote an understanding of the background of the disclosure and may include matters that are not already known to those of ordinary skill in the art.

SUMMARY

Embodiments of the present disclosure can solve problems occurring in the prior art while advantages achieved by the prior art are maintained intact.

An embodiment of the present disclosure provides a controller area network (CAN) fuzzing apparatus for a vehicle and a method thereof that are capable of significantly reducing the time required for CAN fuzzing of the vehicle and monitoring the response of a specific ECU by identifying a target CAN ID based on a parameter identifier (PID) code to be diagnosed, calculating a bit flip rate (BFR) for each bit of a data field in a CAN message corresponding to the target CAN ID, detecting an unused field and a sensor field from the data field of the CAN message based on the BFR, generating a plurality of CAN messages for fuzzing by inputting a preset value into at least one of the unused field and the sensor field, and monitoring a response of an ECU based on the CAN messages on the CAN after inputting the plurality of CAN messages for fuzzing into the CAN.

The technical problems to be solved by some embodiments of the present disclosure are not limited to the aforementioned problems, and any other technical problems not mentioned herein will be clearly understood from the following description by those skilled in the art to which the present disclosure pertains. Also, it may be easily understood that the objects and advantages of embodiments of the present disclosure may be realized by the units and combinations thereof recited in the claims.

According to an embodiment of the present disclosure, a controller area network (CAN) fuzzing apparatus for a vehicle may include a communication device that provides a CAN communication interface, and a controller that identifies a target CAN ID based on a parameter identifier (PID) code to be diagnosed, generates a plurality of CAN messages for fuzzing by inputting a preset value into at least one of an unused field and a sensor field in a data field of a CAN message corresponding to the target CAN ID, and performs CAN fuzzing based on the plurality of CAN messages for fuzzing.

According to an embodiment of the present disclosure, the controller may count CAN IDs having a same value as a return value for the PID code, and determine a CAN ID having a largest number of counts within each time window as the target CAN ID.

According to an embodiment of the present disclosure, the controller may calculate a bit flip rate (BFR) for each bit of a data field in the CAN message corresponding to the target CAN ID, and detect an unused field and a sensor field from data fields of the CAN message based on the BFR.

According to an embodiment of the present disclosure, the controller may determine, among the data fields of the CAN message, a field in which the BFR for each bit is all 0 (zero) as the unused field.

According to an embodiment of the present disclosure, the controller may determine, as the sensor field, a field in which the BFR for each bit decreases in a direction from a least significant bit (LSB) to a most significant bit (MSB) among data fields of the CAN message.

According to an embodiment of the present disclosure, the controller may detect, among sensor fields in the data field of the CAN message corresponding to the target CAN ID, a sensor field in which a numerical value indicating a correlation with a data field in a CAN message having another CAN ID exceeds a reference value.

According to an embodiment of the present disclosure, the controller may infer a value to be recorded in a checksum field of the CAN message for fuzzing based on a deep neural network (DNN) model which completes learning.

According to an embodiment of the present disclosure, the DNN model may have (64-n) nodes as an input layer and $2^n$ nodes as an output layer when the checksum field is n bits.

According to an embodiment of the present disclosure, the controller may inject the plurality of CAN messages for fuzzing into the CAN, and monitor a response of an electronic control unit (ECU) based on the CAN messages on the CAN.

According to an embodiment of the present disclosure, the controller may monitor at least one of a case in which a new CAN ID is generated, a case in which a data length code (DLC) of the CAN ID is changed, a case in which a new value is recorded in the unused field of the CAN message, a case in which a value recorded in the sensor field of the CAN message is out of a normal range, and a case in which a numerical value indicating a correlation between the sensor field of the CAN message corresponding to the target CAN ID and a sensor field of another CAN message is changed from exceeding a reference value to below the reference value.

According to another embodiment of the present disclosure, a controller area network (CAN) fuzzing method for a vehicle may include identifying, by a controller, a target controller area network (CAN) ID based on a parameter identifier (PID) code to be diagnosed, generating, by the controller, a plurality of CAN messages for fuzzing by inputting a preset value into at least one of an unused field and a sensor field in a data field of a CAN message corresponding to the target CAN ID, and performing, by the controller, CAN fuzzing based on the plurality of CAN messages for fuzzing.

According to an embodiment of the present disclosure, the CAN fuzzing method may include counting CAN IDs having a same value as a return value for the PID code, and determining a CAN ID having a largest number of counts within each time window as the target CAN ID.

According to an embodiment of the present disclosure, the CAN fuzzing method may include calculating a bit flip rate (BFR) for each bit of a data field in the CAN message corresponding to the target CAN ID, and detecting an unused field and a sensor field from data fields of the CAN message based on the BFR.

According to an embodiment of the present disclosure, the CAN fuzzing method may include determining, among data fields of the CAN message, a field in which the BFR for each bit is all 0 (zero) as the unused field, and determining, as the sensor field, a field in which the BFR for each bit decreases in a direction from a least significant bit (LSB) to a most significant bit (MSB) among the data fields of the CAN message.

According to an embodiment of the present disclosure, the CAN fuzzing method may include detecting, among sensor fields in the data field of the CAN message corresponding to the target CAN ID, a sensor field in which a numerical value indicating a correlation with a data field in a CAN message having another CAN ID exceeds a reference value.

According to an embodiment of the present disclosure, the CAN fuzzing method may include inferring a value to be recorded in a checksum field of the CAN message for fuzzing based on a deep neural network (DNN) model which completes learning.

According to an embodiment of the present disclosure, the CAN fuzzing method may include inputting the plurality of CAN messages for fuzzing into the CAN, and monitoring a response of an electronic control unit (ECU) based on the CAN messages on the CAN.

According to an embodiment of the present disclosure, the CAN fuzzing method may include a case in which a data length code (DLC) of the CAN ID is changed, a case in which a new value is recorded in the unused field of the CAN message, a case in which a value recorded in the sensor field of the CAN message is out of a normal range, and a case in which a numerical value indicating a correlation between the sensor field of the CAN message corresponding to the target CAN ID and a sensor field of another CAN message is changed from exceeding the reference value to below the reference value.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 4 is an exemplary diagram of a numerical value indicating a correlation between data fields in a CAN message calculated by a controller provided in a CAN fuzzing apparatus for a vehicle according to an embodiment of the present disclosure;

FIG. 5 is a first exemplary diagram illustrating a process in which a controller provided in a CAN fuzzing apparatus for a vehicle according to an embodiment of the present disclosure generates a CAN message for fuzzing;

FIG. 6 is a second exemplary diagram illustrating a process in which a controller provided in a CAN fuzzing apparatus for a vehicle according to an embodiment of the present disclosure generates a CAN message for fuzzing;

FIG. 7 is a third exemplary diagram illustrating a process in which a controller provided in a CAN fuzzing apparatus for a vehicle according to an embodiment of the present disclosure generates a CAN message for fuzzing;

FIG. 9 is an exemplary diagram illustrating a process in which a controller provided in a CAN fuzzing apparatus for a vehicle according to an embodiment of the present disclosure determines that there is an abnormality in a diagnosis target;

DETAILED DESCRIPTION OF ILLUSTRATIVE EMBODIMENTS

Figure 1:
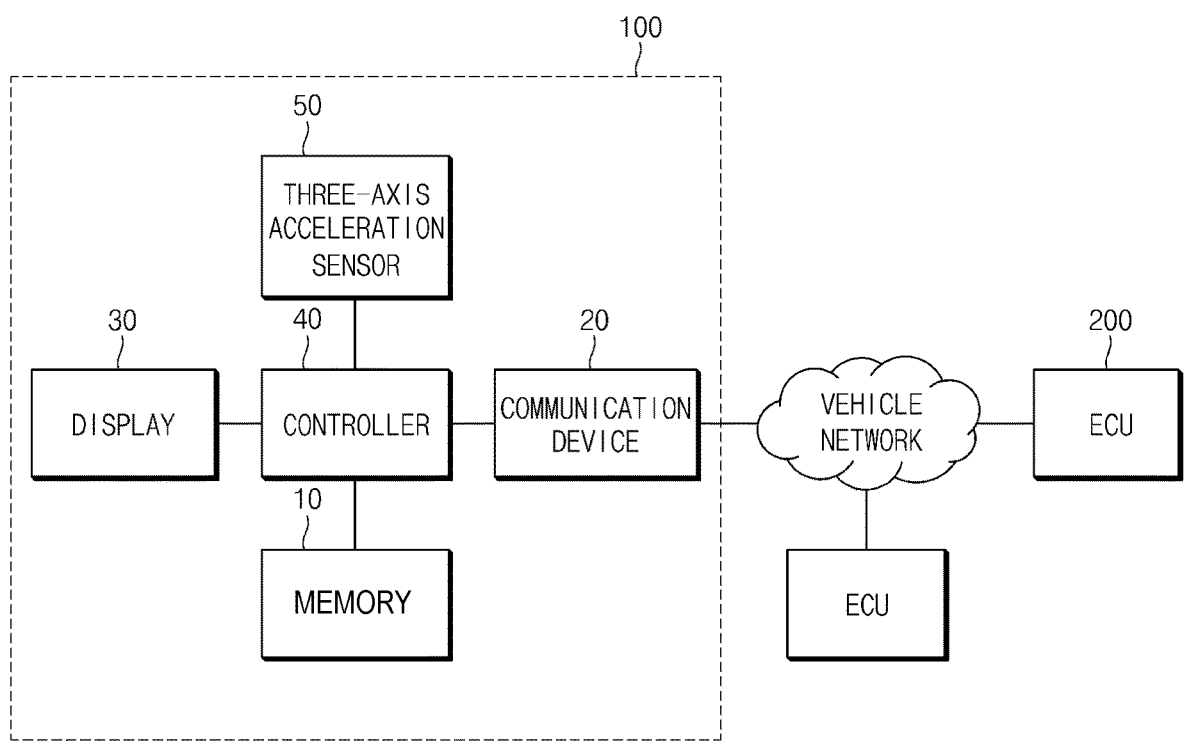
FIG. 1 is a block diagram of a CAN fuzzing apparatus for a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a CAN fuzzing apparatus for a vehicle according to an embodiment of the present disclosure. For example, the CAN fuzzing apparatus may be implemented as a vehicle diagnostic device such as on-board diagnostics (OBD)-II.

As shown in FIG. 1, a CAN fuzzing apparatus 100 for a vehicle according to an embodiment of the present disclosure may include a memory (i.e., storage) 10, a communication device 20, a display 30, a controller 40, and a three-axis acceleration sensor 50. In this case, according to a scheme of implementing the CAN fuzzing apparatus 100 for a vehicle according to an embodiment of the present disclosure, each component may be combined with each other to be implemented as one, or some components may be omitted.

Looking at each component, first, the memory 10 may store various logics, algorithms, and programs required in the process of identifying a target controller area network (CAN) ID based on a parameter identifier (PID) code to be diagnosed, calculating a bit flip rate (BFR) for each bit of a data field in a CAN message corresponding to the target CAN ID, detecting an unused field and a sensor field from the data field of the CAN message based on the BFR, generating a plurality of CAN messages for fuzzing by inputting a preset value into at least one of the unused field and the sensor field, and monitoring a response of an electronic control unit (ECU) based on the CAN message on the CAN after inputting the plurality of CAN messages for fuzzing into the CAN.

For reference, the PID is a code that requests state information of a vehicle system, and all recently released vehicles follow the OBD-II PID standard defined as SAE J1962. However, the vehicle may not support all PIDs according to the standard, and additional PIDs may be defined according to a vehicle manufacturer. Therefore, it is important to determine the PIDs supported by each vehicle, and the supported PIDs may be identified through PID diagnostic queries and responses. When a diagnosis query is requested using the CAN ID 0x7DF and the PID code to be diagnosed on the CAN bus of the vehicle connected through an OBD-II port, a response message with a CAN ID in the range of 0x7E8 to 0x7EF is received from the vehicle. The response message may include the return value requested by the request, and the state of the vehicle and the supported PIDs may be identified based on the return value.

The memory 10 may store PID codes supported by the vehicle and information requested by the PID codes. For example, the memory 10 may store 0x04, 0x05, 0x0C and 0x1F as PID codes. In this case, 0x04 is a code requesting the calculated engine load, 0x05 is a code requesting the engine coolant temperature, 0x0C is a code requesting the engine RPM, and 0x1F is a code for requesting the run time of the engine since the engine starts.

The memory 10 may store a deep neural network (DNN) model that has completed learning and is used to infer a value to be recorded in a checksum field of a CAN message for fuzzing.

The memory 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 20 is a module that provides a communication interface with a vehicle network. In this case, the vehicle network is a controller area network (CAN), a controller area network with flexible data-rate (CAN FD), a local interconnect network (LIN), FlexRay, a media oriented systems transport (MOST), Ethernet, and the like, and in an embodiment of the present disclosure, the CAN will be described as an example.

The communication device 20 may input a plurality of CAN messages for fuzzing into the CAN bus, and may obtain (receive) the plurality of CAN messages through the CAN bus.

The display 30 may display various monitoring results under control of the controller 40. As an example, as a result of fuzzing CAN messages having a CAN ID related to the engine, when a new CAN ID is generated, when a data length code (DLC) of the CAN ID is changed, when a new value is recorded in the unused field of the CAN message, when the value recorded in the sensor field of the CAN message is out of a normal range, or when the value indicating the correlation between the sensor field of the CAN message corresponding to the target CAN ID and the sensor field of another CAN message is changed from exceeding a reference value to below the reference value, the display 30 may warn that the engine is out of order.

The controller 40 may perform overall control such that each component can perform its function normally. The controller 40 may be implemented in the form of hardware or software, or may be implemented in the form of a combination of hardware and software. Preferably, the controller 40 may be implemented with a microprocessor, but the embodiment is not limited thereto.

In particular, the controller 40 may perform various control operations in the process of identifying a target CAN ID based on a PID code to be diagnosed, calculating a BFR for each bit of a data field in a CAN message corresponding to the target CAN ID, detecting an unused field and a sensor field from the data field of the CAN message based on the BFR, generating a plurality of CAN messages for fuzzing by inputting a preset value into at least one of the unused field and the sensor field, and monitoring a response of an ECU based on the CAN message on the CAN after inputting the plurality of CAN messages for fuzzing into the CAN.

Hereinafter, a detailed operation of the controller 40 will be described with reference to FIGS. 2 to 10.

First, the controller 40 periodically requests an OBD-II PID diagnostic query by using the PID code to identify a target CAN ID related to a PID code to be diagnosed, and then, based on the received CAN message, designates a time window of a time range (e.g., ±n seconds). Within such a designated time window, CAN IDs that have a value equal to a return value for the OBD-II PID diagnostic query are counted. By repeating this process, it is determined that the CAN ID, which is counted the most in all time windows, has a high correlation with the PID code used in the diagnostic query. Therefore, it is inferred that the corresponding CAN IDs are related to the function of the vehicle specified in the PID code.

Figure 2:
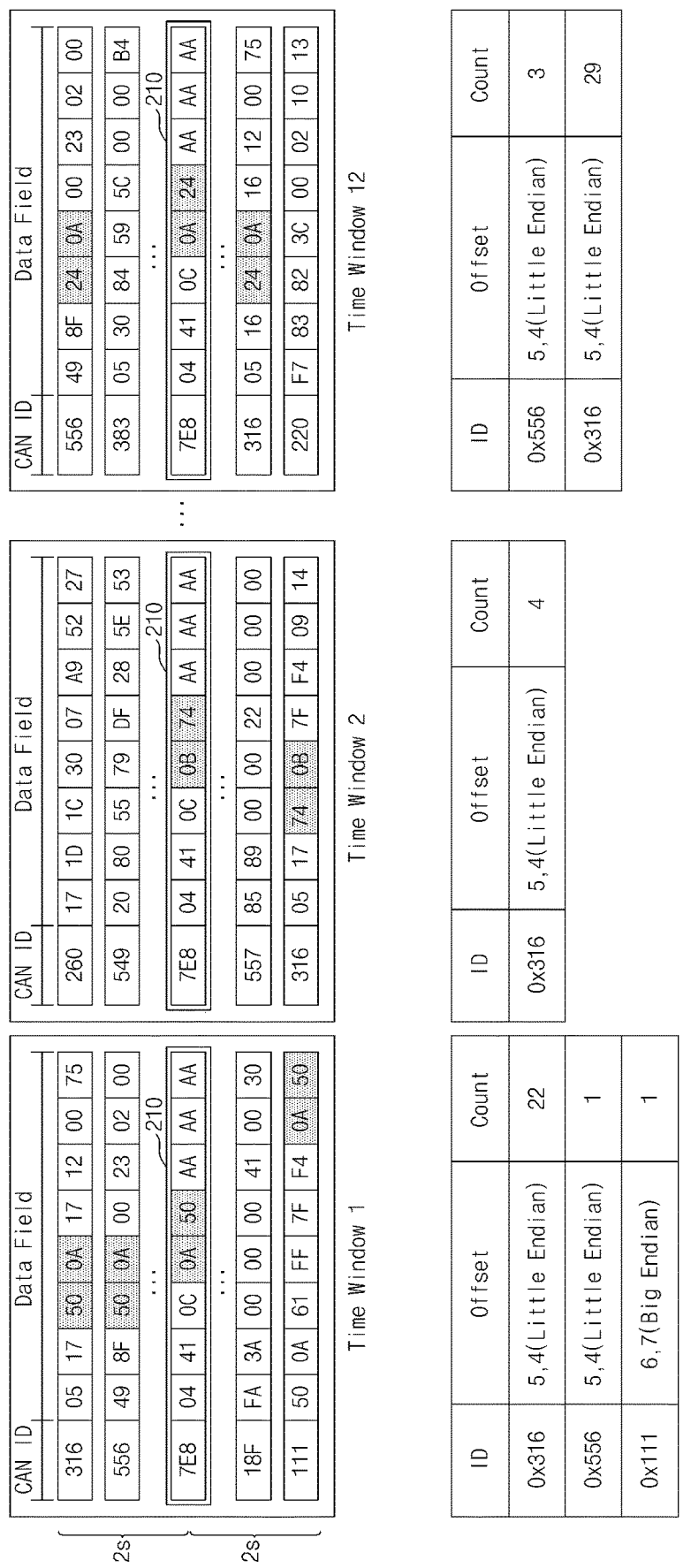
FIG. 2 is an exemplary view illustrating a process of detecting a target CAN ID by the controller provided in a CAN fuzzing apparatus for a vehicle according to an embodiment of the present disclosure.

FIG. 2 is an exemplary view illustrating a process of detecting a target CAN ID by the controller provided in a CAN fuzzing apparatus for a vehicle according to an embodiment of the present disclosure.

In FIG. 2, as a CAN message 210 is a response message to an OBD-II PID (0C) diagnostic query, in time window 1, data (0A, 50) that is recorded in the field following the PID code (0C) of the CAN message 210 is a response to the PID code (0C). In time window 2, the data (0B, 74) recorded in the field following the PID code (0C) of the CAN message 210 is a response to the PID code (0C). In time window 12, data (0A, 24) recorded in the field following the PID code (0C) of the CAN message 210 is a response to the PID code (0C).

The controller 40 counts the CAN IDs having the same value as the return value (0A, 50) for the OBD-II PID (0C) diagnostic query for each time window. For example, because CAN ID 0x316 occurred 22 times in time window 1, CAN ID 0x316 occurred 4 times in time window 2, and CAN ID 0x316 occurred 29 times in time window 12, the controller 40 may determine the CAN ID 0x316 as the target CAN ID. Hereinafter, the CAN ID 0x316 may be denoted while being mixed with the CAN ID 316.

Next, the controller 40 may calculate a BFR of each data field in order to analyze the data field of the CAN message having the target CAN ID. In this case, the data field of the CAN message consists of a total of 8 fields (8 bytes) from field number 0 to field number 7, and each field consists of 1 byte (8 bits). In addition, the BFR which is a value indicating the degree of bit change (0~1) may be calculated, for example, through the following Equation 1:

$$BFR_{c,k} = \frac{1}{n_c} \sum_{i=2}^{n_c} b_{c,k,i} \quad \text{Equation 1}$$

In Equation 1, 'c' denotes a CAN ID, and 'k' denotes a position (0, 1, 2, . . . , 63) of a bit in the data field. In addition, $BFR_{c,k}$ means the bit flip rate of the k-th bit position in the data field of the CAN message (packet) with CAN ID of 'c', and $n_c$ is the total number of CAN IDs of 'c' among CAN messages recorded after monitoring the CAN bus. The $b_{c,k,i}$ is set to '1' when the value of the k-th bit in the data field of the i-th CAN message is different from the value of the k-th bit in the data field of the (i+1)-th CAN message, and is set to '0' when they are the same when CAN messages with CAN ID of 'c' are sorted in order of reception time.

Figure 3:
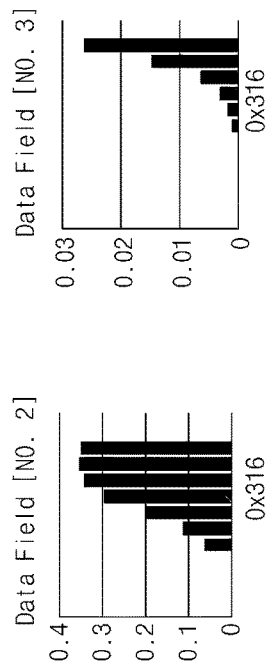
FIG. 3 is an exemplary diagram illustrating the BFR of each data field in the CAN message calculated by the controller provided in a CAN fuzzing device for a vehicle according to an embodiment of the present disclosure.

FIG. 3 is an exemplary diagram illustrating the BFR of each data field in the CAN message calculated by the controller provided in a CAN fuzzing device for a vehicle according to an embodiment of the present disclosure.

The data field of a CAN message having a target CAN ID of 0x316 is a total of 8 (8 bytes), but FIG. 3 shows the BFR for each bit for two fields (field of number 2 and field of number 3). In this case, the BFR of each bit (16-th bit to 23-rd bit) in the field of number 2 shows a decreasing trend from the least significant bit (LSB) to the most significant bit (MSB), so that the controller 40 may determine the field of number 2 as a sensor field. Similarly, the BFR of each bit (24-th bit to 31-st bit) in the field of number 3 shows a decreasing trend from the LSB to the MSB, so that the controller 40 may determine the field of number 3 as the sensor field.

Meanwhile, the controller 40, based on the sensor field (field of number 2 and field of number 3) among the data fields of the CAN message having the target CAN ID 0x316, may calculate a correlation with the data field of the CAN message having a different CAN ID relationship numerically. Among the values calculated in this way, the sensor field exceeding the reference value (0.7) is shown in FIG. 4 as an example.

FIG. 4 is an exemplary diagram of a numerical value indicating a correlation between data fields in a CAN message calculated by a controller provided in a CAN fuzzing apparatus for a vehicle according to an embodiment of the present disclosure.

In FIG. 4, '316[2]' means the field of number 2 among the data fields of the CAN message having the target CAN ID of 0x316, '316[3]' means the field of number 3 among the data fields of the CAN message with the target CAN ID of 0x316, '260[2]' means the field of number 2 among the data fields of the CAN message having the target CAN ID of 0x260, '260[5]' means the field of number 5 among the data fields of the CAN message having the target CAN ID of 0x260, '329[6]' means the field of number 6 among the data fields of the CAN message having the target CAN ID of 0x329, '43F[6]' means the field of number 6 among the data fields of the CAN message having the target CAN ID of 0x43F, '440[2]' means the field of number 2 among the data fields of the CAN message having the target CAN ID of 0x440, and '440[6]' means the field of number 6 among the data fields of the CAN message having the target CAN ID of 0x440.

Therefore, the sensor fields of the CAN ID whose correlation with '316[2]' exceeds the reference value (0.7) are '260[2]', '260[5]', '329[6]', '43F[6]', '440[2]', and '440[6]'. Similarly, the sensor fields of the CAN ID with correlation with '316[3]' that exceed the reference value (0.7) are '260[2]', '260[5]', '329[6]', '43F[6]', '440[2]', and '440[6]'.

As described above, the controller 40 may generate a CAN message for fuzzing when the analysis of the data field of the CAN message is completed.

FIG. 5 is a first exemplary diagram illustrating a process in which a controller provided in a CAN fuzzing apparatus for a vehicle according to an embodiment of the present disclosure generates a CAN message for fuzzing, where the BFR for each bit of the field of number 0 and the BFR for each bit of the field of number 1 among the data fields of the CAN message having the target CAN ID of 0x316 are shown.

Because the BFR for each bit of the field of number 1 is all '0', the controller 40 may determine the field of number 1 as an unused field, and may input 256 ($2^8$) values from 00 to ff into the field of number 1 of the CAN message having the target CAN ID of 0x316, thereby generating a total of 256 CAN messages for fuzzing.

FIG. 6 is a second exemplary diagram illustrating a process in which a controller provided in a CAN fuzzing apparatus for a vehicle according to an embodiment of the present disclosure generates a CAN message for fuzzing, where the BFR for each bit of the field of number 4 and the BFR for each bit of the field of number 5 among the data fields of the CAN message having the target CAN ID of 0x316 are shown.

In FIG. 6, because the BFR of each bit (32-nd bit to 39-th bit) in the field of number 4 shows a decreasing trend from the LSB to the MSB, the field of number 4 is a sensor field. Because the BFR of each bit (40-th bit to 47-th bit) in the field of number 5 shows a decreasing trend from the LSB to the MSB, the field of number 5 is a sensor field.

Because the field of number 4 among the data fields of the CAN message having the target CAN ID of 0x316 is a sensor field, the controller 40 may generate 105 (256-151) CAN messages for fuzzing by inputting a value out of the minimum value (00) to the maximum value (97) in the field of number 4. In this case, 97 is a hex value.

In addition, because the field of number 5 among the data fields of the CAN message having the target CAN ID of 0x316 is a sensor field, the controller 40 may generate 211 (256-45) CAN messages for fuzzing by inputting a value out of the minimum value (00) to the maximum value (2C) in the field of number 5. In this case, because the 40-th bit and the 41-st bit of the field of number 5 are '0', the maximum value is 2C.

As a result, the controller 40 may generate a CAN message for fuzzing by changing the values of all sensor fields among the data fields of the CAN message having the target CAN ID of 0x316.

FIG. 7 is a third exemplary diagram illustrating a process in which a controller provided in a CAN fuzzing apparatus for a vehicle according to an embodiment of the present disclosure generates a CAN message for fuzzing.

The data field of the CAN message having the target CAN ID of 0x316 shown in FIG. 7 is the same as the data field of the CAN message having the target CAN ID of 0x316 shown in FIG. 3.

In addition, the data field of another CAN message that has a correlation with the data field of number 2 of the CAN message having the target CAN ID of 0x316 exceeding the reference value, and the data field of another CAN message that has a correlation with the data field of number 3 of the CAN message having the target CAN ID of 0x316 exceeding the reference value are the same as those shown in FIG. 4.

Therefore, the controller 40 may generate a total of 65,536 (256×256) CAN messages for fuzzing by inputting 256 (0 to 255) values into the fields of number 2 and number 3 of the data field of the CAN message having the target CAN ID of 0x316, respectively.

As a result, the controller 40 may generate a CAN message for fuzzing by changing the values of all sensor fields in which the numerical value indicating the correlation exceeds the reference value.

Meanwhile, the controller 40 may infer a value recorded in the checksum field of the CAN message for fuzzing by using a DNN model.

Figure 8:
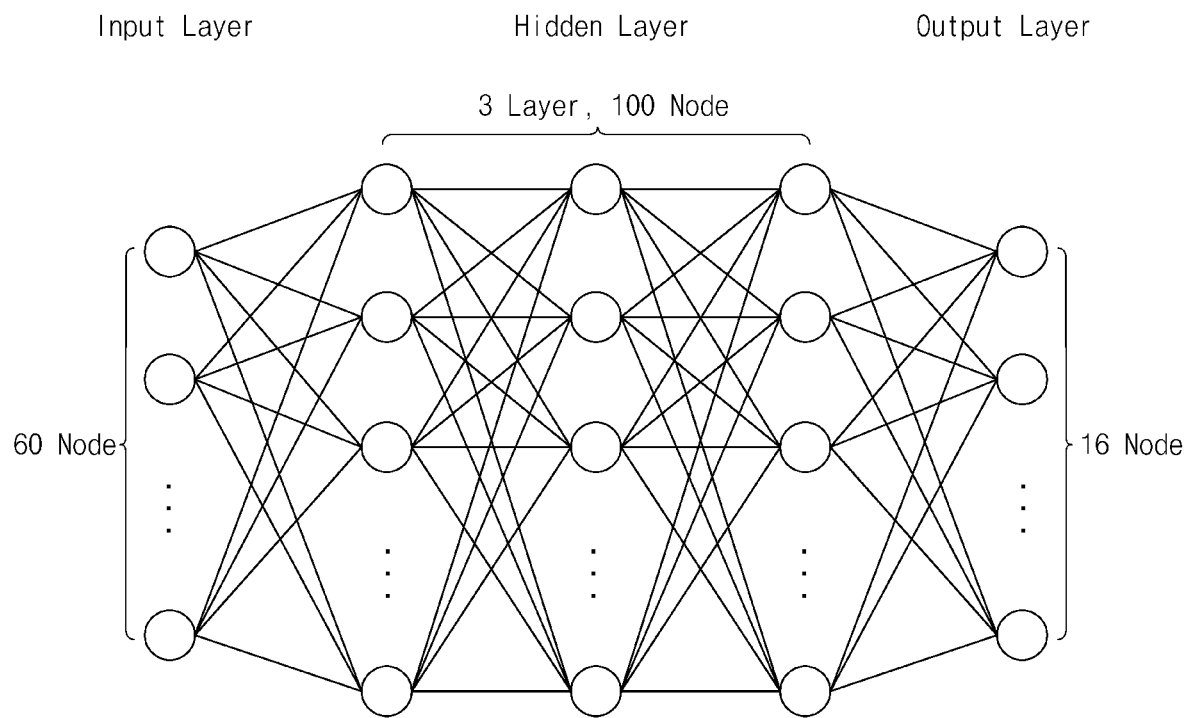
FIG. 8 is an exemplary diagram of a DNN model provided in a CAN fuzzing apparatus for a vehicle according to an embodiment of the present disclosure.

FIG. 8 is an exemplary diagram of a DNN model provided in a CAN fuzzing apparatus for a vehicle according to an embodiment of the present disclosure.

As shown in FIG. 8, the input layer of the DNN model may include 64 nodes, the hidden layer may include 100 nodes as 3 layers, and the output layer may include 16 nodes. This is a case where the checksum field is assumed to be 4 bits. When the checksum field is n bits, the input layer of the DNN model may include (64-n) nodes, and the output layer may include $2^n$ nodes.

Meanwhile, in the process of inputting the CAN message for fuzzing into the CAN, when a transmission error counter (TEC) exceeds a threshold value (e.g., 255) to cause bus-off due to a collision between the CAN message generated in the vehicle system and the CAN message for fuzzing generated by the controller 40, the controller 40 may resume CAN fuzzing after reset.

In addition, in the process of monitoring CAN messages on the CAN after inputting CAN messages for fuzzing into the CAN, when a data length code (DLC) of the CAN ID is changed, when a new value is recorded in the unused field of the CAN message, when the value recorded in the sensor field of the CAN message is out of a normal range, or when the value indicating the correlation between the sensor field of the CAN message corresponding to the target CAN ID and the sensor field of another CAN message is changed from exceeding a reference value to below the reference value, the controller 40 may warn that the engine is out of order.

FIG. 9 is an exemplary diagram illustrating a process in which a controller provided in a CAN fuzzing apparatus for a vehicle according to an embodiment of the present disclosure determines that there is an abnormality in a diagnosis target.

As shown in FIG. 9, it can be seen that the numerical value indicating the correlation exceeding the reference value decreased below the reference value. This means that there is an abnormality in the diagnosis target.

Additionally, the controller 40 may detect whether the diagnosis target is abnormal based on the physical change. That is, the controller 40 may detect whether the diagnosis target is abnormal based on the sensor value before CAN fuzzing and the sensor value after CAN fuzzing.

Figure 10:
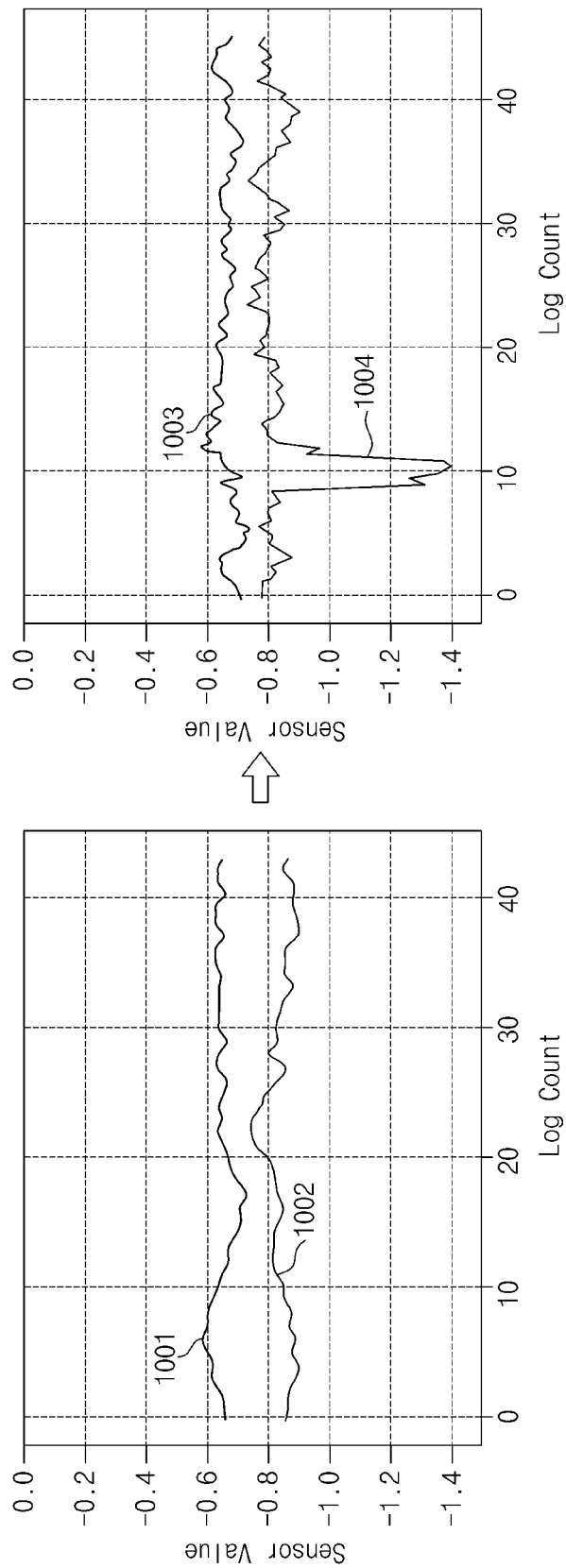
FIG. 10 is an exemplary diagram illustrating a process in which a controller provided in a CAN fuzzing apparatus for a vehicle according to an embodiment of the present disclosure detects whether a diagnosis target is abnormal based on sensor information.

FIG. 10 is an exemplary diagram illustrating a process in which a controller provided in a CAN fuzzing apparatus for a vehicle according to an embodiment of the present disclosure detects whether a diagnosis target is abnormal based on sensor information.

In FIG. 10, reference numeral '1001' indicates the y-axis acceleration of the three-axis acceleration sensor 50 and reference numeral '1002' indicates the x-axis acceleration of the three-axis acceleration sensor 50.

As shown in FIG. 10, the y-axis acceleration 1001 before CAN fuzzing is not significantly different from the y-axis acceleration 1003 after CAN fuzzing, but the x-axis acceleration 1002 before CAN fuzzing shows a large difference from the x-axis acceleration 1004 after CAN fuzzing. Accordingly, the controller 40 may detect that a diagnosis target is abnormal.

Figure 11:
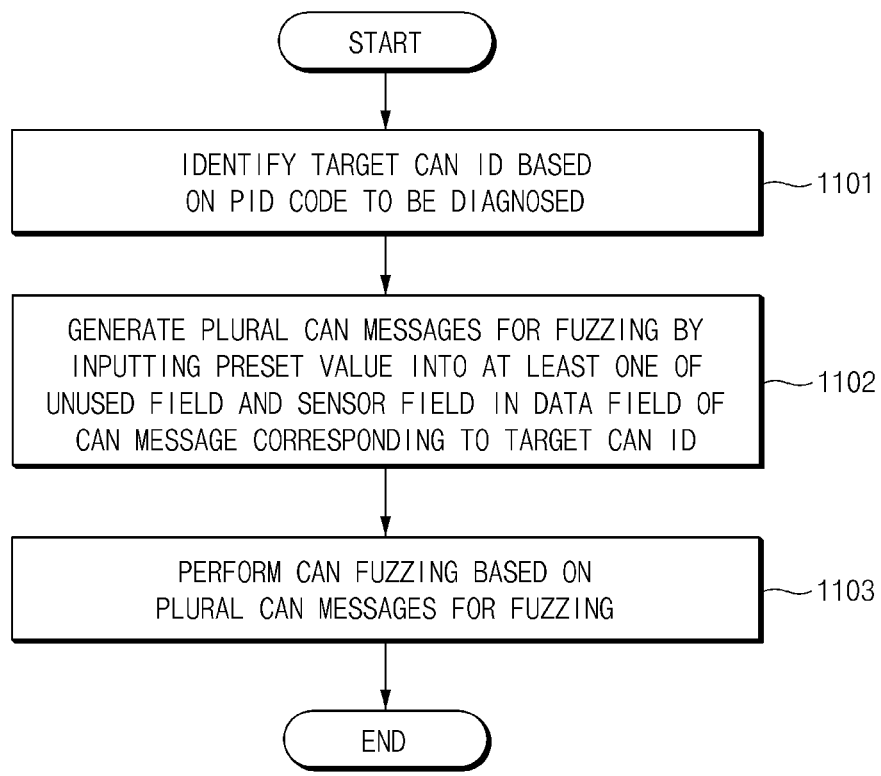
FIG. 11 is a flowchart of a CAN fuzzing method for a vehicle according to an embodiment of the present disclosure.

FIG. 11 is a flowchart of a CAN fuzzing method for a vehicle according to an embodiment of the present disclosure.

First, the controller 40 identifies a CAN ID based on a PID code to be diagnosed in 1101.

Thereafter, in 1102, the controller 40 generates a plurality of CAN messages for fuzzing by inputting a preset value into at least one of an unused field and a sensor field in the data field of the CAN message corresponding to the target CAN ID.

Thereafter, the controller 40 performs CAN fuzzing based on the plurality of CAN messages for fuzzing in 1103.

Figure 12:
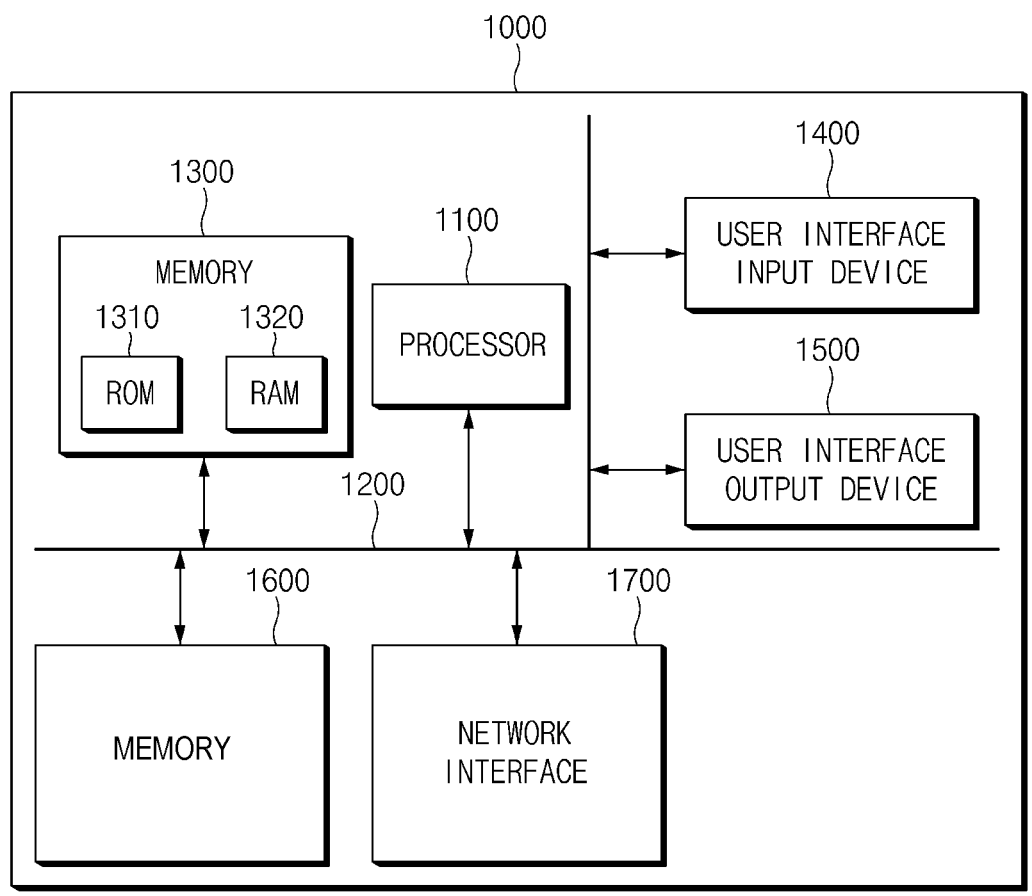
FIG. 12 is a block diagram illustrating a computing system for executing a CAN fuzzing method for a vehicle according to an embodiment of the present disclosure.

FIG. 12 is a block diagram illustrating a computing system for executing a CAN fuzzing method for a vehicle according to an embodiment of the present disclosure.

Referring to FIG. 12, as described above, a CAN fuzzing method for a vehicle according to an embodiment of the present disclosure may be implemented with a computing system. The computing system 1000 may include at least one processor 1100, a memory 1300, a user interface input device 1400, a user interface output device 1500, a memory (i.e., storage) 1600, and a network interface 1700 connected through a system bus 1200.

The processor 1100 may be a central processing unit (CPU) or a semiconductor device that processes instructions stored in the memory 1300 and/or the memory 1600. The memory 1300 and the memory 1600 may include various volatile or nonvolatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor, a software module, or a combination thereof. The software module may reside in a storage medium (that is, the memory 1300 and/or the memory 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, the controller area network (CAN) fuzzing apparatus for a vehicle and the method thereof according to the embodiments of present disclosure can significantly reduce the time required for CAN fuzzing of the vehicle and monitor the response of a specific ECU by identifying a target CAN ID based on a parameter identifier (PID) code to be diagnosed, calculating a bit flip rate (BFR) for each bit of a data field in a CAN message corresponding to the target CAN ID, detecting an unused field and a sensor field from the data field of the CAN message based on the BFR, generating a plurality of CAN messages for fuzzing by inputting a preset value into at least one of the unused field and the sensor field, and monitoring a response of an ECU based on the CAN messages on the CAN after inputting the plurality of CAN messages for fuzzing into the CAN.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A controller area network (CAN) fuzzing apparatus for a vehicle, the apparatus comprising:
 a communication device having a CAN communication interface; and
 a controller configured to:
  identify a target CAN identifier (ID) to be diagnosed based on a parameter identifier (PID) code to monitor a response of a specific ECU in a CAN environment;
  generate a plurality of CAN messages for fuzzing by inputting a preset value into an unused field or a sensor field in a data field of a CAN message corresponding to the target CAN ID; and
  perform CAN fuzzing based on the plurality of CAN messages for fuzzing.

2. The apparatus of claim 1, wherein the controller is configured to:
 count CAN IDs having a same value as a return value for the PID code; and
 determine a CAN ID having a largest number of counts within each time window as the target CAN ID.

3. The apparatus of claim 1, wherein the controller is configured to:
 calculate a bit flip rate (BFR) for each bit of the data field of the CAN message corresponding to the target CAN ID; and
 detect the unused field and the sensor field from the data field of the CAN message based on the BFR.

4. The apparatus of claim 3, wherein the controller is configured to determine, among the data fields of the CAN message, a field in which the BFR for each bit is all 0 (zero) as the unused field.

5. The apparatus of claim 3, wherein the controller is configured to determine, as the sensor field, a field in which the BFR for each bit decreases in a direction from a least significant bit to a most significant bit among the data fields of the CAN message.

6. The apparatus of claim 1, wherein the controller is configured to detect, among sensor fields in the data field of the CAN message corresponding to the target CAN ID, a sensor field in which a numerical value indicating a correlation with a data field in a CAN message having another CAN ID exceeds a reference value.

7. The apparatus of claim 1, wherein the controller is configured to infer a value to be recorded in a checksum field of the CAN message for fuzzing based on a deep neural network (DNN) model which completes learning.

8. The apparatus of claim 7, wherein the DNN model has (64-n) nodes as an input layer and $2^n$ nodes as an output layer when the checksum field is n bits.

9. The apparatus of claim 1, wherein the controller is configured to:
 inject the plurality of CAN messages for fuzzing into the CAN; and
 monitor a response of an electronic control unit based on the CAN messages on the CAN.

10. The apparatus of claim 9, wherein the controller is configured to monitor a case in which a new CAN ID is generated, a case in which a data length code of the CAN ID is changed, a case in which a new value is recorded in the unused field of the CAN message, a case in which a value recorded in the sensor field of the CAN message is out of a normal range, or a case in which a numerical value indicating a correlation between the sensor field of the CAN message corresponding to the target CAN ID and a sensor field of another CAN message is changed from exceeding a reference value to being below the reference value.

11. A controller area network (CAN) fuzzing method for a vehicle, the method comprising:

identifying a target CAN identifier (ID) to be diagnosed based on a parameter identifier (PID) code to monitor a response of a specific ECU in a CAN environment;

generating a plurality of CAN messages for fuzzing by inputting a preset value into an unused field or a sensor fields in a data field of a CAN message corresponding to the target CAN ID; and performing CAN fuzzing based on the plurality of CAN messages for fuzzing.

12. The method of claim 11, wherein identifying the target CAN ID comprises:

counting CAN IDs having a same value as a return value for the PID code; and determining a CAN ID having a largest number of counts within each time window as the target CAN ID.

13. The method of claim 11, wherein generating the plurality of CAN messages for fuzzing comprises:

calculating a bit flip rate (BFR) for each bit of the data field of the CAN message corresponding to the target CAN ID; and detecting the unused field and the sensor field from data fields of the CAN message based on the BFR.

14. The method of claim 13, wherein detecting the unused field comprises determining, among the data fields of the CAN message, a field in which the BFR for each bit is all 0 (zero) as the unused field.

15. The method of claim 13, wherein detecting the sensor field comprises determining, as the sensor field, a field in which the BFR for each bit decreases in a direction from a least significant bit to a most significant bit among the data fields of the CAN message.

16. The method of claim 11, wherein generating the plurality of CAN messages for fuzzing comprises detecting, among the sensor fields in the data field of the CAN message corresponding to the target CAN ID, a sensor field in which a numerical value indicating a correlation with a data field in a CAN message having another CAN ID exceeds a reference value.

17. The method of claim 11, wherein generating the plurality of CAN messages for fuzzing comprises inferring a value to be recorded in a checksum field of the CAN message for fuzzing based on a deep neural network (DNN) model which completes learning.

18. The method of claim 17, wherein the DNN model has (64-n) nodes as an input layer and $2^n$ nodes as an output layer when the checksum field is n bits.

19. The method of claim 11, wherein performing the CAN fuzzing comprises:

inputting the plurality of CAN messages for fuzzing into the CAN; and monitoring a response of an electronic control unit based on the CAN messages on the CAN.

20. The method of claim 19, wherein monitoring the response comprises monitoring a case in which a new CAN ID is generated, a case in which a data length code of the CAN ID is changed, a case in which a new value is recorded in the unused field of the CAN message, a case in which a value recorded in the sensor field of the CAN message is out of a normal range, or a case in which a numerical value indicating a correlation between the sensor field of the CAN message corresponding to the target CAN ID and a sensor field of another CAN message is changed from exceeding a reference value to being below the reference value.

* * * * *